United States Patent [19]

Anderson et al.

[11] Patent Number: 4,596,744

[45] Date of Patent: Jun. 24, 1986

[54] OXIME BLOCKED ISOCYANATE CROSS-LINKER FOR CATHODIC ELECTROCOAT

[75] Inventors: Terry L. Anderson, Rochester Hills; Tapan K. Deb Roy, Novi; Ding Y. Chung, Farmington Hills, all of Mich.

[73] Assignee: Inmont Corporation, Clifton, N.J.

[21] Appl. No.: 696,238

[22] Filed: Jan. 29, 1985

[51] Int. Cl.$^4$ .................. C08G 59/14; C08G 18/58; C25D 13/00

[52] U.S. Cl. .................. 428/418; 204/181.7; 523/415; 528/45; 525/504

[58] Field of Search .................. 528/45; 523/415; 428/418; 204/181.7; 525/504

[56] References Cited

U.S. PATENT DOCUMENTS

| | | | |
|---|---|---|---|
| 3,922,253 | 11/1975 | Jerabek et al. | 260/77.5 |
| 3,947,338 | 3/1976 | Jerabek et al. | 523/415 X |
| 3,984,299 | 10/1976 | Jerabek | 204/181 |
| 4,031,050 | 6/1977 | Jerabek et al. | 528/45 X |
| 4,093,594 | 6/1973 | Anderson | 260/47 |
| 4,101,486 | 7/1978 | Bosso et al. | 528/45 X |
| 4,134,864 | 1/1979 | Belanger | 260/18 |
| 4,137,140 | 1/1979 | Belanger | 204/181 |
| 4,139,510 | 2/1979 | Anderson | 260/18 |
| 4,182,831 | 1/1980 | Hicks | 528/103 |
| 4,225,478 | 9/1980 | Hicks | 260/29.2 |
| 4,225,479 | 9/1980 | Hicks | 260/29.2 |
| 4,339,369 | 6/1982 | Hicks et al. | 523/414 |
| 4,419,467 | 12/1983 | Wismer et al. | 523/416 |
| 4,468,307 | 8/1984 | Wismer et al. | 204/181 |
| 4,507,412 | 3/1985 | Hickner et al. | 528/45 X |

*Primary Examiner*—Earl Nielsen
*Attorney, Agent, or Firm*—Emil Richard Skula

[57] ABSTRACT

Oxime blocked polyisocyanate cross-linking agents for use with amine epoxy resin adducts in cathodic electrodeposition processes. The oxime blocking agents are the reaction products of acyclic aliphatic carbonyl-containing compounds having at least 7 carbon atoms and hydroxylamine. The oxime blocked polyisocyanates produce cathodic electrodeposited coatings which are smoother than coatings produced by oxime blocked polyisocyanates known in the art.

20 Claims, No Drawings

4,596,744

OXIME BLOCKED ISOCYANATE CROSS-LINKER FOR CATHODIC ELECTROCOAT

DESCRIPTION

1. Technical Field

The field of art to which this invention pertains is epoxy resins, and, more specifically, epoxy resin compositions containing blocked isocyanate cross-linking agents for use in cathodic electrocoat processes.

2. Background Art

The use of electrodepositable resin compositions in aqueous baths to coat objects is well known in the art. Typically, a resinous composition, which has been mixed with a cross-linking composition to form an electrodepositable coating composition, is salted with an acid so that the composition is solubilized in water. The aqueous coating composition is thought to be closer to a dispersion than a true solution and is typically described as solubilized rather than dissolved. The resins typically used are epoxide resins which have been either reacted with or adducted with amines. The amine is necessary so that a nitrogen atom is available to be salted by an acid to solubilize the composition in water. Solubilization is typically done by feeding an electrodepositable resin composition into a reactor vessel containing an organic or inorganic acid and water.

The electrodeposition bath generally contains an anode, immersed in the bath, which is connected to a DC electric circuit. An article to be coated must comprise an electrically conductive material such as metal. The article is connected to the previously mentioned DC circuit and functions as the cathode. The article is dipped into the bath wherein electrons flow through the cathode to the anode, i.e. conventional current flow from the anode to the cathode. Simultaneously, positively charged particles of the electrodepositable coating composition are transported and deposited on the surfaces of the cathodic article. The film thickness of the deposited film is a function of time, current flow, conductivity, etc., and is related to the resinous composition utilized in the bath. The current flow diminishes as the deposited film layer increases in thickness due to the electrically insulating properties of the coating. The coated article is then removed from the bath after the desired thickness is achieved and typically baked in an oven as a curing step resulting in the cross-linking or curing of the coating composition, thereby producing a hard, corrosion resistant coating. Although there are many patents covering compositions of this type, some of the more typical patents are described below.

U.S. Pat. No. 4,031,050 discloses cationic electrodepositable compositions comprising amine-epoxy resin adducts and blocked polyisocyanates.

Cationic epoxide-amine reaction products used as electrodepositable coating resins are disclosed in U.S. Pat. No. 4,182,833. This patent also discloses the use of blocked polyisocyanate cross-linking compositions.

U.S. Pat. No. 4,104,147 discloses electrodepositable cationic chain extended polyepoxides, wherein the molecule is extended with an organic polyol, which is adducted with a secondary amine and cured with capped or blocked isocyanate derivatives.

U.S. Pat. No. 4,225,479 discloses electrodepositable resin compositions comprising the reaction product of a polyepoxide resin and a primary amine. This patent also discloses the use of cross-linking agents such as aminoplast resins, phenoplast resins and blocked polyisocyanates.

U.S. Pat. No. 4,093,594 discloses polyepoxide resins adducted with polymines using an excess of amine. The resins are then reacted with a monoepoxide or a monocarboxylic acid, and, when reacted with an acid, form water soluble or dispersible resins useful to coat objects in cathodic electrodeposition processes.

An improved process for the preparation of cationic resins wherein polyepoxide resins are contacted with particular polyether polyols and then reacted with cationic base group formers such as an amine or an acid is disclosed in U.S. Pat. No. 4,419,467.

The cathodic electrodepositable coating compositions known in the art have several disadvantages associated with their use including inadequate film build and throwpower, high bake temperatures, and rough film surfaces.

Build is defined as film thickness. Throwpower relates to the capacity to coat areas of the cathodic article which are remote or shielded from the anode. Throwpower is defined as the rate of deposition of film relative to the position of the anode.

While great strides have been made in this area of electrodepositable coating compositions, there is a constant search for improvements in this technology such as high film build, high throwpower, smooth film surfaces and low cross-linking temperatures. In particular, it is recognized in the art that electrodepositable resin compositions containing ketoxime blocked polyisocyanate cross-linking agents cure at lower temperatures but produce coatings having rough surfaces. Roughness of a coating can be determined visually by comparing the coating to a standard coating and noting the differences in gloss, smoothness, etc. The roughness of a coating can also be measured by an instrument known as a profilometer. Rough surfaces are typically seen in coatings which are deposited by conventional cathodic electrodeposition processes from resins containing polyisocyanates blocked with oximes known in the art such as methylethyl ketoxime and cyclohexanone oxime. These rough surfaces are typified by a sandy, gritty, uneven, nonuniform appearance with little or no gloss or reflectance. The smoothness of an electrodeposited coating composition relates to the flow of the deposited composition during the baking process. Flow is defined as the tendency of the electrodeposited cathodic resin composition particles to liquify or melt and coalesce in the presence of heat prior to the onset of cross-linking. It is critical in obtaining a smooth surface that little or no cross-linking occur prior to flow.

Accordingly what is needed in the art are cathodic electrodepositable coating compositions which solve the problems of the prior art.

DISCLOSURE OF INVENTION

It has been found that novel cathodic electrodepositable resin compositions comprising an amine-epoxy resin abduct and an oxime blocked polyisocyanate cross-linking agent produce a film forming composition which is curable after deposition at a temperature of about 225° F. to about 275° F. The films formed are durable and smooth. The improvement comprises the use in the cathodic electrodepositable resin composition of an oxime blocked polyisocyanate cross-linking agent wherein the oxime is the reaction product of an acyclic aliphatic carbonyl-containing compound having at least 7 carbon atoms and hydroxyl amine.

Another aspect of this invention is an improved method of depositing a resin composition comprising an amine-epoxy resin abduct and an oxime-blocked polyisocyanate cross-linking agent on a conductive substrate in an electrodeposition process, by forming an aqueous dispersion by solubilizing the resin composition with an acid, forming an aqueous dispersion, immersing the substrate in the aqueous dispersion, connecting the substrate to an electric current such that the substrate serves as a cathode, passing a direct current through the substrate for a sufficient time such that a film of said composition is deposited thereon, thereby producing a coating curable after deposition at about 225° F. to about 275 ° F. and a smooth, durable epoxy resin coating. The improvement comprises the use of an oxime-blocked polyisocyanate cross-linking agent wherein the oxime is the reaction product of an aliphatic carbonyl-containing compound having at least 7 carbon atoms and hydroxyl amine.

Another aspect of this invention is an aqueous cathodic electrodepositable coating composition comprising an acid solubilized amine-epoxy resin abduct and an improved oxime-blocked polyisocyanate cross-linking agent, said coating composition capable of producing a film curable after deposition at about 225° F. to about 275° F. to a durable, smooth film. The improvement comprises the use of an oxime blocking agent comprising the reaction product of an aliphatic carbonyl group-containing compound having at least 7 carbon atoms and hydroxyl amine.

Another aspect of this invention is a coated article coated with a cationic electrodepositable amine-epoxy resin abduct composition contains an oxime blocked polyisocyanate, wherein the article is coated by solubilizing a sufficient amount of said composition in an aqueous bath containing an anode to form an aqueous dispersion by acid salting said composition, connecting an electrically conductive article to a DC electric circuit to act as a cathode, immersing the article in the bath and passing a sufficient direct current across the article for a sufficient amount of time to produce a coating of said composition on said article, removing the article from the bath, and then curing said film, at about 225° F. to about 275° F., thereby producing a durable, smooth coating. The improvement comprises the use of the oxime-blocking agent comprising the reaction product of an aliphatic carbonyl-containing compound having at least 7 carbon atoms and hydroxyl amine.

The foregoing, and other features and advantages of the present invention will become more apparent from the following description.

BEST MODE FOR CARRYING OUT THE INVENTION

Ketones or aldehydes having at least 7 carbon atoms may be used in the practice of this invention. Example of these compounds include methyl amyl ketone, heptyl aldehyde, etc. These compounds are well known and commercially available. It is preferred to use methyl-n-amyl ketone in the practice of this invention.

Methyl-n-amyl ketone is a commercially available liquid having the formula $CH_3 CH_2 CH_2 CH_2 CH_2 C O CH_3$. Methyl-n-amyl ketoxime blocking agent is made by reacting methyl-n-amyl ketone with hydroxylamine.

Hydroxylamine is a commercially available crystalline substance having the formula $NH_2OH$. In the practice of this invention the hydroxyl amine salts such as hydroxylamine hydrochloride, hydroxylamine sulfate, hydroxylamine hydrochloride, hydroxylamine acid sulfate, etc., are preferably used. The use of the term "hydroxylamine" is defined to mean the compound itself or the previously mentioned salts.

The methyl-n-amyl ketoxime is made by reacting sufficient quantities of methyl-n-amyl ketone with an hydroxylamine salt for a sufficient amount of time at a sufficient temperature so that the reaction product is formed. Typically, about 1.6 to about 2 moles of methyl-n-amyl ketone are charged into a conventional reactor vessel along with about 1 to about 2 moles of hydroxylamine salt and about 2 moles of NaOH, etc. The reactor charge is stirred and reacted at a temperature of typically about 25° F. to about 212° F., more typically about 80° F. to about 160° F., and preferably about 100° F. to about 130° F. The methyl-n-amyl ketoxime is removed from the reactor vessel by separation from the aqueous layer.

The reaction conditions are essentially the same as the above-mentioned when reacting the other ketones or aldehydes used in the practice of this invention with hydroxyl amine to form the oximes of the present invention.

The organic polyisocyanates used in the practice of this invention are typical of those used in the art, e.g., U.S. Pat. No. 4,182,831, the disclosure of which is incorporated by reference.

Useful blocked polyisocyanates are those which are stable in the dispersion systems at ordinary room temperature and which react with the resinous product of this invention at elevated temperatures.

In the preparation of the blocked organic polyisocyanates, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the aromatic compounds such as m-phenylene, phenylene, 4,4'-diphenyl, and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the triisocyanates such as triphenyl methane-4,4'4"-triisocyanate, 1,3,5-triisocyanate benzene and 2,4,6-triisocyanate toluene; and the tetraisocyanates such as 4,4'-diphenyl-dimethyl methane-2,2',5,5'-tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be prepolymer derived from a polyol such as glycols, e.g. ethylene glycol and propylene glycol, as well as other polyols such as glycerol, trimethylolpropane, hexanetriol, pentaerythritol, and the like, as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Particularly preferred polyisocyanates include the reaction product of toluene diisocyanate and trimethylol propane and, the isocyanurate of hexamethylene diisocyanate.

The blocked polyisocyanates are formed by reacting sufficient quantities of blocking agent with sufficient quantities of organic polyisocyanate at a sufficient temperature for a sufficient amount of time under reaction conditions conventional in this art such that no free isocyanate groups are present when the reaction has run its course. Typically about one mole of polyisocyanate is charged into a conventional reactor vessel. Typically about one mole to about five moles of oxime is added, more typically about two moles to about five moles, preferably about two moles to about four moles. In addition one or more of the following compositions is charged: methyl isobutyl ketone, butanol, methyl ethyl ketone, toluol, or an equivalent organic solvent.

The reaction temperature varies with the type of polyisocyanate used, for example, when reacting toluene disocyanate-trimethanol propane with a ketoxime, the reaction is typically carried out at about 150° F. to about 220° F., more typically about 160° F. to about 210° F., and preferably about 180° F. to about 200° F. The reactor charge is mixed for about 15 minutes to about 120 minutes, more typically about 20 minutes to about 40 minutes, and preferably about 25 minutes to about 35 minutes. The ketoxime blocked polyisocyanate is left in solution after the reaction is complete.

The cathodic electrodepositable coating compositions of this invention comprise epoxy resins which may optionally be chain-extended resulting in an increase in the molecular weight of the epoxy molecules by reacting with water miscible or water soluble polyols.

The epoxides useful in the practice of this invention are the polyepoxides typically used in this art and comprise a resinous material containing at least one epoxy group per molecule.

A particularly useful class of polyepoxides are the glycidyl polyethers of polyhydric phenols.

Such polyepoxide resins are derived from an epihalohydrin and a dihydric phenol and have an epoxide equivalent weight of about 400 to about 4,000. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxydiphenyl ethane, bis(2-hydroxynaphthy) methane, 1,5-dihydroxynaphthylene and the like with Bisphenol A being preferred. These polyepoxide resins are well known in the art and are made in desired molecular weights by reacting the epihalohydrin and the dihydric phenol in various ratios or by reacting a dihydric phenol with a lower molecular weight polyepoxide resin. Particularly preferred polyepoxide resins are glycidyl polyethers of Bisphenol A having epoxide equivalent weights of about 450 to about 2,000, more typically about 800 to about 1,600 and preferably about 800 to about 1,500.

The polyepoxides used in the practice of this invention will have a relatively high molecular weight, that is, the molecular weight will typically be about 900 to about 4,000, more typically about 1,600 to about 3,200, and preferably about 1,600 to about 2,800.

Another quite useful class of polyepoxides are produced similarly from novolak resins or similar polyphenol resins.

Also suitable are the polyepoxides comprising similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis (4-hydroxycyclohexyl) 2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid terephthalic acid, 2,6-naphthylane dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are nonphenolic and are obtained by the epoxidation of alicyclic olefins. For example, by oxygen and selected method catalysts, by perbenzoic acids, by acetaldehyde monoperacetate, or by peracetic acid. Among such polyepoxides are the epoxy alicyclic ethers and esters which are well known in the art.

Other epoxy-containing compounds and resins include nitrogeneous diepoxides such as disclosed in U.S. Pat. No. 3,365,471; epoxy resins from 1,1-methylene bis (5-substituted hydantoin), U.S. Pat. No. 3,391,097; bisimide containing diepoxides, U.S. Pat. No. 3,450,711; epoxylated ammomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

Although the oxime-blocked polyisocyanate crosslinking agents of the present invention can be used successfully with conventional amine containing-epoxy resins known in the cathodic electrodeposition art, it is preferable to use modified epoxy resins. Specifically, the modified epoxy resins used in the practice of this invention will comprise one of the aforementioned epoxy resin compositions chain extended with a water miscible or water soluble polyol, reacted with excess amine, and finally reacted with a fatty acid or aliphatic monoepoxide.

The water soluble or water miscible polyols, used to optionally chain extend epoxy resins, include organic polyols containing at least one and preferably two alcohol primary hydroxyls. Mixtures of organic polyols may be used in the practice of this invention, as well as mixtures of organic polyols and primary mono primary alcohols. These organic polyols will have a molecular weight of about 200 to about 3,000, more typically about 300 to about 1,000, and preferably about 400 to about 700.

Water miscible is defined as the ability or tendency of the polyol to mix or blend uniformly with water. By water soluble is meant the ability or tendency of the polyol to blend uniformly with water.

The organic polyols which are used in the practice of this invention are those known in the art, e.g. polyols disclosed in U.S. Pat. No. 4,104,147 which is incorporated by reference.

The water soluble or water miscible polyols which are used to generate the modified epoxy resins of this invention include the aliphatic polyols, the aromatic polyols, alkylene polyols, butadiene polyols, and butadiene acrylonitrile polyols.

Specific examples of the organic polyols used in the practice of this invention include Tone 200 brand polyol manufactured by Union Carbide Corp., Carbowax PG 300 and Carbowax PG 400 polyols manufactured by Union Carbide Corp., SynFac 8007 and SynFac 8008 brand polyols manufactured by Milliken Chemical Co., Spartanburg, S.C., and Hycar HTBN brand polyol manufactured by B. F. Goodrich Chemical Corp., Cleveland, Oh. A particularly preferred polyol is SynFac 8008 brand.

The modification of the polyepoxide, that is, the chain extension and corresponding increase of molecular weight, is accomplished by mixing the organic polyol with the polyepoxide in an organic solvent, such as toluene, methyl isolbutyl ketone xylene, etc., and reacting these products at a sufficient temperature for a sufficient amount of time in a conventional reactor in the presence of a catalyst to completely react the polyepoxide. Typically, the reaction temperature will be about 200° F. to about 350° F., more typically about 250° F. to about 320° F., preferably about 260° F. to about 300° F.

Typically the reaction time is about 120 minutes to about 300 minutes, more typically about 160 minutes to about 260 minutes, preferably about 180 minutes to about 240 minutes.

Typically about 1.5 to about 3 epoxide equivalents of polyepoxide are reacted, more typically about 2 to about 2.5, preferably about 2 equivalents with one equivalent of polyol. Examples of suitable catalysts include benzyl dimethylamine, triethylamine, triphenol phosphine, boron trifluoride, dimethylcyclohexylamine, and dimethylethanolamine or any Lewis acid.

The polyamines used in the practice of this invention are typical of those known in the art such as the polyamines disclosed in U.S. Pat. No. 4,139,510, which is incorporated by reference.

The polyamines which are reacted with the polyepoxide resins in this invention contain at least 2 amine nitrogen atoms per molecule, at least 3 amine hydrogen atoms per molecule and no other groups which are reactive with epoxide groups. These polyamines can be aliphatic, cycloaliphatic or aromatic and contain at least 2 carbon atoms per molecule. Useful polyamines contain about 2 to about 6 amine nitrogen atoms per molecule, 3 to about 8 amine hydrogen atoms and 2 to about 20 carbon atoms. Examples of such amines are the alkylene polyamines, ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, o,m and p-phenylene diamine 4,4'-methylene dianiline, menthane diamine, 1,4-diaminocyclohexame, methyl-aminopropylamine, and the like. Preferred amines for use in this invention are alkylene polyamines of the formula:

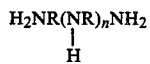

wherein n is an integer of 0 to 4 and R is an alkylene group containing 2 to 4 carbon atoms. Examples of such alkylene polyamines are ethylene diamine, diethylene triamine, triethylene tetramine, tetraethylene pentamine, pentaethylene hexamine, dipropylene triamine, tributylene tetramine and the like. Mixtures of amines can also be used. The more preferred amines are the ethylene polyamines with the most preferred being triethylene tetramine, tetraethylene pentamine, and diethylene triamine.

Sufficient quantities of polyamine are reacted with sufficient quantities of modified polyepoxide resin so that the adduct formed contains about 1 mole of adducted polyamine molecule for each epoxide equivalent originally present in polyepoxide resin. The adducting reaction typically requires about 1.5 to about 15.0 moles of polyamine, i.e., an excess, for each epoxide equivalent of the polyepoxide resin, more typically about 2.0 moles to about 12.0 moles, and preferably about 3.0 moles to about 10.0 moles. Since excess polyamine is used, the excess unreacted polyamine must be removed by distillation after reaction to prevent gellation of the reaction product.

In preparing the modified epoxy-polyamine compositions sufficient quantities of polyamine are reacted with sufficient quantities of modified polyepoxide resin in a conventional reactor vessel for a sufficient period of time at a sufficient temperature to react all of the epoxide groups. Typically, the reaction temperature will be about 75° F. to about 220° F., more typically about 80° F. to about 190° F., and preferably about 140° F. to about 180° F. The reaction time is typically about five minutes to about 60 minutes, more typically about ten minutes to about 40 minutes, and preferably about 25 minutes to about 30 minutes. When the adducting reaction is complete, the unreacted or excess polyamine is removed by distillation with sufficient vacuum and at a sufficient temperature to remove the excess polyamine. Typical distillation temperatures are about 275° F. to about 500° F., more typically 320° F. to about 475° F. and preferably about 425° F. to about 450° F. Typical vacuums are about 60 mmHg to about 76 mmHg, more typically about 65 mmHg to about 76 mmHg and preferably about 74 mmHg to about 76 mmHg.

Fatty acids which can be used, to optionally modify the epoxy resins used in the practice of this invention, are monocarboxylic acids containing about 4 to 22 carbon atoms. The fatty acids may be saturated or unsaturated. The fatty acids are typical of those known in the art. Examples of such acids are caprylic acid, capric acid, stearic acid, benzoic acid, oleic acid, linoleic acid, linolenic acid and liconic acid. Such acids can be those derived from naturally occurring oils and which are named from the oil from which it is derived, e.g., linseed fatty acids, soya fatty acids, cottonseed fatty acids, cocoanut fatty acid and the like. A particularly preferred fatty acid is pelargonic acid.

The monoepoxides which can be used to optionally modify the epoxy resins used in the practice of this invention contain one 1,2-epoxide group per molecule and about 6 to about 24 carbon atoms per molecule. The monoepoxides used in the practice of this invention are typical of those known in the art such as the monoepoxides disclosed in U.S. Pat. No. 4,139,510 which is incorporated by reference.

Examples of monoepoxides are epoxidized hydrocarbons, epoxidized unsaturated fatty esters, monoglycidyl ethers of aliphatic alcohols and monoglycidyl esters of monocarboxylic acids. Examples of such monoepoxides are: epoxidized unsaturated hydrocarbons which contain 6 to about 24 carbon atoms, e.g., octylene oxide; decylene oxide, dodecylene oxide and nonadecylene oxide, epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is incorporated by reference. Examples of such glycidyl esters are those derived from about 9 to about 19 carbon atoms, particularly Versatic 911 Acid, a product of Shell Oil Company, which acid contains 9 to 11 carbon atoms.

The monoepoxides or fatty acids are optionally reacted with the modified epoxy-polyamine adducts of this invention to improve the electrical insulating properties of the deposited electrodepositable resin compositions of this invention. In addition, these components improve the properties of the deposited coating such as flexibility, corrosion resistance, and hardness.

Sufficient quantities of modified epoxy-polyamine adducts are mixed with sufficient quantities of fatty acid or monoepoxide in an organic solvent such as xylene, or toluene in a conventional reactor vessel for a sufficient period of time at a sufficient temperature to complete the reaction. Typically about one mole of modified epoxy-polyamine adduct is reacted with the following amounts of fatty acid or monoepoxide.

When fatty acid is the reactant, typically about 0.5 moles to about 2.75 moles of fatty acid are reacted with the adduct, more typically about 1 mole to about 2.25 moles, and preferably about 1 mole to about 2 moles. The reaction temperature is typically about 300° F. to about 400° F., more typically about 325° F. to about 390° F., and preferably about 350° F. to about 375° F.; the reaction time is about 60 minutes to about 180 minutes, more typically about 60 minutes to about 140 minutes and preferably about 120 minutes, or until the acid value is reduced to below about 6.

When monoepoxide is the reactant, typically about 0.5 mole to about 2.25 moles of monoepoxide are reacted with the adduct, more typically about 1 mole to about 2.25 moles, preferably about 1 mole to about 2 moles. The reaction temperature is typically about 150° F. to about 300° F., more typically about 150° F. to about 280° F., and preferably about 150° F. to about 250° F.; reaction times are typically about 60 minutes to about 180 minutes, more typically about 60 minutes to about 150 minutes, and preferably about 60 minutes to about 100 minutes.

Sufficient quantities of blocked polyisocyanate are incorporated into the electrodepositable coating compositions of this invention such that the deposited coating will be completely cured upon baking and there will be no free isocyanate groups remaining. Typically, about 20 wt. % to about 80 wt. % of blocked polyisocyanate is incorporated based upon the total weight of amine containing-epoxide resin composition and cross-linking agent, more typically about 30 wt. % to about 70 wt. %, preferably about 35 wt. % to about 45 wt. %.

The blocked polyisocyanates of this invention are mixed with the amine epoxy resin abduct compositions, preferably the optionally modified epoxy-polyamine-fatty acid or epoxy-polyamine-monoepoxide reaction products, by adding the blocked polyisocyanates to a reactor containing the epoxy resin composition and mixing the charge for about one-half hour.

In order to solubilize an amine-epoxy resin abduct composition, it is necessary to salt the reaction product with a water soluble acid. The acids which can be used include those known in the art such as formic acid, acetic acid, phosphoric acid, lactic acid, hydrochloric acid, etc. Sufficient quantities of the acid are mixed with said amine-containing epoxy resin compositions to solubilize or disperse the resin in water. One method in which the salting process is accomplished is by charging the amine-epoxy resin abduct composition, an acid, cosolvents, water and surfactants conventional in the art into a reactor vessel, and mixing the reactor charge with a slow speed mixer until the reaction has been completed. In a preferred method, acid, water, etc. are initially added to a reactor vessel, then the resin is charged while the reactants are mixed with a slow speed mixer. Typically, the reaction temperature is about 25° F. to about 150° F., more typically about 100° F. to about 140° F., and preferably about 120° F. The reaction will be typically run for about 15 minutes to about 90 minutes, more typically about 25 minutes to about 80 minutes, and preferably 60 minutes.

Typically, about 0.1 Meq to about 0.8 Meq of acid is used per gram of solid resin, more typically about 0.2 Meq to about 0.7 Meq, and preferably about 0.2 Meq to about 0.5 Meq.

Electrodepositable cathodic coating compositions containing the oxime blocked polyisocyanate cross-linking agents of this invention are used in an electrodeposition process as an aqueous dispersion. Sufficient quantities of the resin composition are used so that the concentration of the resin composition in an aqueous bath will produce a coating on an article of sufficient thickness so that upon baking the coating will have the desired characteristics such as smooth surface, high build, short coating time and low temperature cures. Typically, the concentration in water of the resin compositions of this invention are about 10 wt. % to about 40 wt. %, more typically about 10 wt. % to about 30 wt. %, and preferably about 15 wt. % to about 25 wt. %.

It should be noted that the cathodic electrodepositable resins are typically shipped by the manufacturer to the user as a salted aqueous dispersion having a concentration of about 20 wt. % to about 36 wt. % of solids.

The cathodic electrodepositable coating baths of this invention are typically formed by mixing the solubilized (i.e., salted) cathodic electrodepositable resin compositions of this invention in concentrate form with water, although dry resin could be used. The electrodeposition bath may contain additional ingredients such as pigments, cosolvents, antioxidants, surfactants, etc., which are typically used in electrodeposition processes known in the art. Pigment compositions may be of any conventional type and are one or more of such pigments as the iron oxides, the lead oxides, strontium chromate, carbon black, titanium dioxide, talc, barium sulphite, barium yellow, cadmium red, chromic green, lead silicate, etc. Sufficient quantities of pigment are used to achieve the appearance characteristics desired such as gloss, reflectance, hue tint and other desired characteristics. Typically, the amount of pigment used is expressed in a ratio of total pigment to total binder. Typically a pigment to binder ratio of about 0.1 to about 0.4 is used in the electrodepositable resin compositions of the present invention, more typically about 0.15 to about 0.35, preferably about 0.2 to about 0.3. Pigment is typically added to the electrodeposition bath in paste form, i.e., predispersed in a composition comprising pigment, amine-epoxy resin abduct and surfactants.

The electrodeposition baths may contain coupling solvents which are water soluble or partially water soluble organic solvents for the resinous vehicles used in the practice of this invention. The coupling solvents or cosolvents used in the practice of this invention are those typically used and known in the art.

Examples of such coupling solvents include monomethyl ether ethylene glycol, monoethyl ether ethylene glycol, monobutylether, diethylene glycol monobutylether, ethanol, isopropanol, n-butenol, etc. Sufficient amounts of coupling solvent are used so that a good emulsion resulting in a smooth deposited film is produced. Typically, the amount of coupling solvent used will be about 0.5 wt. % to about 10 wt. % of the total weight of the coating bath, more typically about 1 wt. % to about 5 wt. %, and preferably about 1 wt. % to about 2 wt. %.

The electrodeposition process typically takes place in an electrically insulated tank containing an electrically conductive anode which is attached to a direct current source. The size of the tank will depend on the size of the article to be coated. Typically, the tank is constructed of stainless steel or mild steel lined with a dielectric coating such as epoxy impregnated fiberglass or polypropylene. The electrodepositable cathodic resinous coating compositions of this invention are typically used to coat articles such as automobile or truck bodies. The typical size of an electrodeposition bath tank used for this purpose is about 60,000 gallons to about 120,000 gallons.

Typically, the article to be coated is connected to the direct current circuit so that the conductive object acts as the cathode. When the article is immersed in the coating bath, flow of electrons from the cathode to the anode, that is, conventional current flow from the anode to the cathode, results in the particles of the dispersed cationic electrodepositable resin composition being deposited on the surfaces of the article. The particles of the dispersed resin composition are positively charged and are therefore attracted to the negative cathodic surface of the object to be coated. The thickness of coating deposited upon the object during its residence in the electric cathodic coating bath is a function of the cathodic electrodepositable resin composition, the voltage across the article, the current flux, the pH of the coating bath, the conductivity, the residence time, etc. Sufficient voltage will be applied to the coated article for a sufficient time to obtain a coating of sufficient thickness. Typically, the voltage applied across the coated article is about 50 volts to about 500 volts, more typically about 200 to about 350 volts, and preferably about 225 volts to about 300 volts. The current density is typically about 0.5 ampere per sq. ft. to about 30 amperes per sq. ft., more typically about one ampere per sq. ft. to about 25 amperes per sq. ft., and preferably about one ampere per sq. ft. The article to be coated typically remains in the coating bath for a sufficient period of time to produce a coating or film of sufficient thickness, having sufficient resistance to corrosion and flexibility. The residence time or holding time is typically about 1 minute to about 3 minutes, more typically about 1 minute to about 2½ minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically, the pH is about 4 to about 7 more typically about 5 to about 6.8, and preferably about 6 to about 6.5.

The conductivity of the coating bath will be sufficient to produce a coated film of sufficient thickness. Typically the conductivity will be about 800 micro mhos to about 3,000 micro mhos, more typically about 800 micro mhos to about 2,200 micro mhos, and preferably about 900 micro mhos to about 1,800 micro mhos.

The desirable coating thicknesses are sufficient to provide resistance to corrosion while having adequate flexibility. Typically, the film thicknesses of the coated objects of this invention will be about 0.4 mil to about 1.8 mils, more typically about 0.6 mil to about 1.6 mils, and preferably about 1.2 mils to about 1.4 mils.

The temperature of the coating bath is preferably maintained through cooling at a temperature less than about 86° F.

When the desired thickness of the coating has been achieved the coated object is removed from the electrodeposition bath and cured. Typically, the electrodeposited coatings are cured in a conventional convection oven at a sufficient temperature for a sufficient length of time to unblock the blocked polyisocyanates and allow for cross-linking of the electrodepositable resin compositions. Typically, the coated articles will be baked at a temperature of about 200° F. to about 600° F., more typically about 250° F. to about 290° F., and preferably about 225° F. to about 275° F. The coated articles will be baked for a time period of about 10 minutes to about 40 minutes, more typically about ten minutes to about 35 minutes, and preferably about 15 minutes to about 30 minutes.

It is contemplated that the coated articles of the present invention may also be cured by using radiation, vapor curing, contact with heat transfer fluids, and equivalent methods.

The smoothness of the cured coating is a function of the "flow" of the deposited coating composition. Flow is defined as the tendency of the electrodeposited coating composition to liquify during the curing operation and form a smooth cohesive film over the surface of a coated article prior to the onset cross-linking.

Typically the coated articles of this invention will comprise conductive substrates such as metal, including steel, aluminum, copper, etc., however, any conductive substrate having a conductivity similar to the aforementioned metals may be used. The articles to be coated may comprise any shape so long as all surfaces can be wetted by the electrodeposition bath. The characteristics of the article to be coated which have an effect on the coating include the shape of the article, the capacity of the surfaces to be wetted by the coating solution, and the degree of shielding from the anode. Shielding is defined as the degree of interference with the electromotive field produced between the cathode and the anode, thereby preventing the coating composition from being deposited in those shielded areas. A measure of the ability of the coating bath to coat remote areas of the object is throwpower. Throwpower is a function of the electrical configuration of the anode and cathode as well as the conductivity of the electrodeposition bath.

The coatings of the coated articles of this invention exhibit superior smoothness, gloss, flexibility, durability, and resistance to corrosion. Smoothness and gloss are related to the flow of the electrodeposited cathodic resin. Durability, flexibility and resistance to corrosion are related to the chemical nature of the electrodeposited cathodic resin as well as the smoothness of the deposited coating. These coating compositions readily accept an automotive primer overcoat.

It should be noted that the articles which are coated by the coating compositions of this invention are typically automobile bodies which have been pretreated to remove impurities and contaminants in a phosphotizing bath.

The following example is illustrative of the principles and practice of this invention, although not limited thereto. Parts and percentages where used are parts and percentages by weight.

EXAMPLE

A. Methyl-n-amyl ketoxime was prepared by initially charging 656 parts of hydroxylamine sulfate, 2,000 parts of water, and 730 parts of methyl-n-amyl ketone to a conventional reactor and thoroughly mixing the components. Then, 320 parts of sodium hydroxide were slowly charged to this mixture, the charge was held at about 120° F. for about four hours. The resulting oily layer containing methyl-n-amyl ketoxime was then separated and washed with water. Residual water was removed from the methyl-n-amyl ketoxime by azeotroping with methyl isobutyl ketone by preparing a 50:50 mixture of methyl-n-amyl ketoxime and methyl isobutyl ketone.

Methyl-n-amyl ketoxime blocked polyisocyanate was prepared by slowly charging 516 parts of the 50:50 methyl-n-amyl ketoxime and methyl isobutyl ketone mixture into a reactor vessel containing 348 parts of an 80/20 isomer mixture of 2,4-/2,6-toluene diisocyanate under agitation with a dry nitrogen blanket, the reaction was maintained at a temperature below 100° F. The charge was held an additional one-half hour at 100° F. and then heated to 140° F., at which time 89 parts of trimethylopropane were added under agitation. The charge was maintained at 210° F. to 220° F. for about one and one-half hours until essentially all of the isocyanate moiety was consumed as indicated by infrared scan. The batch was then thinned with 40 parts of butanol.

B. The amine epoxy was prepared by charging 1436 parts of bisphenol A based epoxy (WPE=800, 69% solid in toluene) to a reactor vessel containing about 730 parts of tetraethylenetriamine at 140° F. over a one-hour time period. After the epoxy was completely charged, the mixture was heated to 180° F. and held for one hour. The excess amine was vacuum distilled until no more distillate was observed to be coming out. The charge was then heated to 330° F. and 612 parts of methyl isobutyl ketone was added. The batch was heated to reflux and to remove water. At this point, a ketimine of the polymer was formed. When no more water was observed to be coming out, an additional 200 parts of methylisobutyl ketone was added to the reaction mixture. Then, 572 parts of an aliphatic monoepoxy, Azepoxy #8 (AZS Co.), were added. The reaction temperature was then maintained at 250° F. for two hours.

C. The acylic flow agent was prepared by charging 44 parts of butyl acrylic, 15 parts of hydroethyl acrylic, 15 parts of dimethylaminoethyl methacrylic, 2 parts of styrene, 1 part of octyl mercaptan, 4 parts of VAZO 67, and 3 parts of acetone to a refluxing mixture of 13 parts of methyl isobutyl ketone and 2 parts of acetone over a 4-hour period, after a 15-minute holding period, 0.14 parts of VAZO 67 and 1 part of methyl isobutyl ketone were added. The batch was maintained at the refluxing temperature for another hour.

D. The principal emulsion was prepared by adding 616 parts of B, 342 parts of A, 22 parts of C to 12 parts of acetic acid and 864 parts of deionized water under high agitation. The organic solvents were driven off after agitation for 3 days.

E. The adduct E and the adduct D are the two intermediates for the grinding vehicle. The adduct E was prepared by charging ethylene glycol monopropyl ether to 2,4-toluene diisocyanates under agitation with a dry nitrogen blanket. The reaction was maintained at a temperature below 100° F. The charge was held an additional one and one-half hours.

F. To 455 parts of Triton X-102 (an alkylaryl polyether alcohol manufactured by Rohm and Haas Co., Philadelphia, PA) and 51 parts of methyl isobutyl ketone previously azeotroped to remove water, 109 parts of 2,4-toluene diisocyonate were added. The reaction was maintained at 115° F. for two hours. To this product, 56 parts of dimethyl ethanol amine was charged, and the reaction was maintained at 160° F. for one hour. Finally, 50 parts of ethylene glycol monobutyl ether,75 parts of lactic acid, and 89 parts of deionized water were added. The reaction was held at 190° F. for one hour.

G. The grinding vehicle was prepared by charging 88 parts of the adduct E to a reaction vessel containing 206 parts of EPON 1002F (WPE=650, manufactured by Shell Chemical Co., Houston, TX) and 39 parts of isobutyl methyl ketone. The reaction temperature was maintained at 250° F. for one hour. Then, 186 parts of ethylene glycol monobutyl ether and 381 parts of adduct F were added. The batch was maintained at 180° F. for four hours.

H. A pigment paste was prepared by grounding 203 parts of the grinding vehicle G, 17 parts of ethyl glysol monobutyl ether, 274 parts of deionized water, 67 parts of aluminum silicate, 317 parts of TiO2, 3 parts of lead silicate, 6 parts of carbon black, and 19 parts of dibutyl tin oxide in a steel ball mill to 12 microns. Then, 66 parts of additional deionized water was added.

I. A dispersion suitable for electrodeposition composed of 1718 parts of the principal emulsion D, 1152 parts of deionized water, and 330 parts of the pigment paste H. The dispersion had a pH of 6.2 and total solid of 25 percent. Zinc phosphated steel panels electrocoated at 200 volts for two minutes gave a smooth film of 1.0–1.4 mils after a 235° F. bake for 25 minutes. The film was durable against methyl ethyl ketone.

Although this invention has been shown and described with respect to the detailed embodiment thereof, it will be understood by those skilled in the art that various changes in form and detail thereof may be made without departing from the spirit and scope of the claimed invention.

We claim:

1. A cathodic electrodepositable resin composition comprising an amine-epoxy resin adduct and an oxime-blocked polyisocyanate cross-linking agent, wherein the improvement comprises using as the oxime the reaction product of an acyclic aliphatic carbonyl-containing compound having at least 7 carbon atoms and hydroxylamine, the composition curable after deposition at about 225° F. to about 275° F. to a durable, smooth film.

2. The cathodic electrodepositable resin composition of claim 1 wherein the carbonyl containing compound is a ketone.

3. The cathodic electrodepositable resin composition of claim 1 wherein the carbonyl containing compound is methyl-n-amyl ketone.

4. The cathodic electrodepositable resin composition of claim 1 wherein the carbonyl containing group is an aldehyde.

5. The cathodic electrodepositable resin of claim 1 in which the polyisocyanate is the reaction product of toluene diisocyanate and trimethylol propane.

6. A method of depositing by cathodic electrodeposition a resin composition comprising an amine-containing epoxy resin and an oxime-blocked polyisocyanate cross-linking agent on a conductive article by salting the resin composition, forming an aqueous coating bath with the salted resin, connecting the article to a DC circuit so that the article serves as a cathode, immersing the article in the coating bath, passing a direct current through the article so that a coating of the resin composition is deposited on the article, removing the article from the bath and then curing the coating, the improvement comprising using as the oxime the reaction product of an aliphatic carbonyl-containing compound having at least 4 carbon atoms and hydroxylamine, the composition curable after deposition at about 225° F. to about 250° F. to a durable, smooth film.

7. The method of claim 6 wherein the carbonyl-containing compound is a ketone.

8. The method of claim 6 wherein the carbonyl-containing compound is methyl-n-amyl ketone.

9. The method of claim 6 wherein the carbonyl-containing compound is an aldehyde.

10. The method of claim 6 wherein the polyisocyanate is the reaction product of toluene diisocyanate and trimethylol propane.

11. An aqueous cathodic electrodepositable coating bath comprising an acid solubilized amine-epoxy resin adduct and a cross-linking agent comprising an oxime blocked polyisocyanate, wherein the improvement comprises an oxime which is the reaction product of an acyclic aliphatic carbonyl-containing compound having at least 7 carbon atoms and hydroxylamine, wherein the amine-epoxy resin adduct and blocked polyisocyanate when deposited on a conductive article in a cathodic electrodeposition process is curable at about 225° F. to about 275° F. to a durable, smooth film.

12. The coating bath of claim 11 wherein the carbonyl-containing compound is a ketone.

13. The coating bath of claim 11 wherein the carbonyl-containing compound is methyl-n-amyl ketone.

14. The coating bath of claim 11 wherein the carbonyl-containing compound is an aldehyde.

15. The coating bath of claim 11 wherein the polyisocyanate is the rection product of toluene diisocyanate and trimethylol propane.

16. A coated article coated with an electrodepositable coating composition, wherein the coating composition comprises an amine-epoxy resin adduct and an oxime-blocked polyisocyanate, the coated article produced by initially salting the resin adduct with an acid, solubilizing a sufficient amount of said composition in an aqueous coating bath containing an anode, connecting the article to a DC electric circuit to act as a cathode, immersing the article in the bath, passing a sufficient direct current across the article for a sufficient amount of time to produce a film of said composition, then removing the article from the bath and curing the film, wherein the improvement comprises using as the oxime the reaction produce of an acyclic aliphatic carbonyl-containing compound having at least 7 carbon atoms and hydroxylamine, the composition curable at about 225° F. to about 275° F. to a smooth, durable film.

17. The coated article of claim 16 wherein the carbonyl-containing compound is a ketone.

18. The coated article of claim 16 wherein the carbonyl-containing compound is methyl-n-amyl ketone.

19. The coated article of claim 16 wherein the carbonyl-containing compound is an aldehyde.

20. The coated article of claim 15 wherein the polyisocyanate is the reaction product of toluene diisocyanate and trimethylolpropane.

* * * * *